C. L. LEONARD.
PASTRY BOARD.
APPLICATION FILED APR. 27, 1920.
1,375,399.
Patented Apr. 19, 1921.
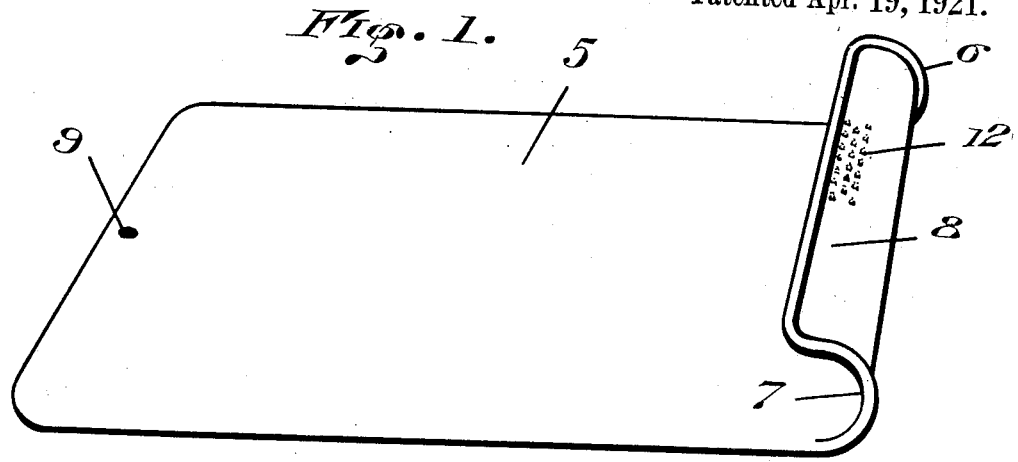
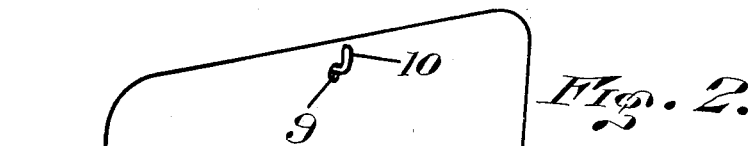
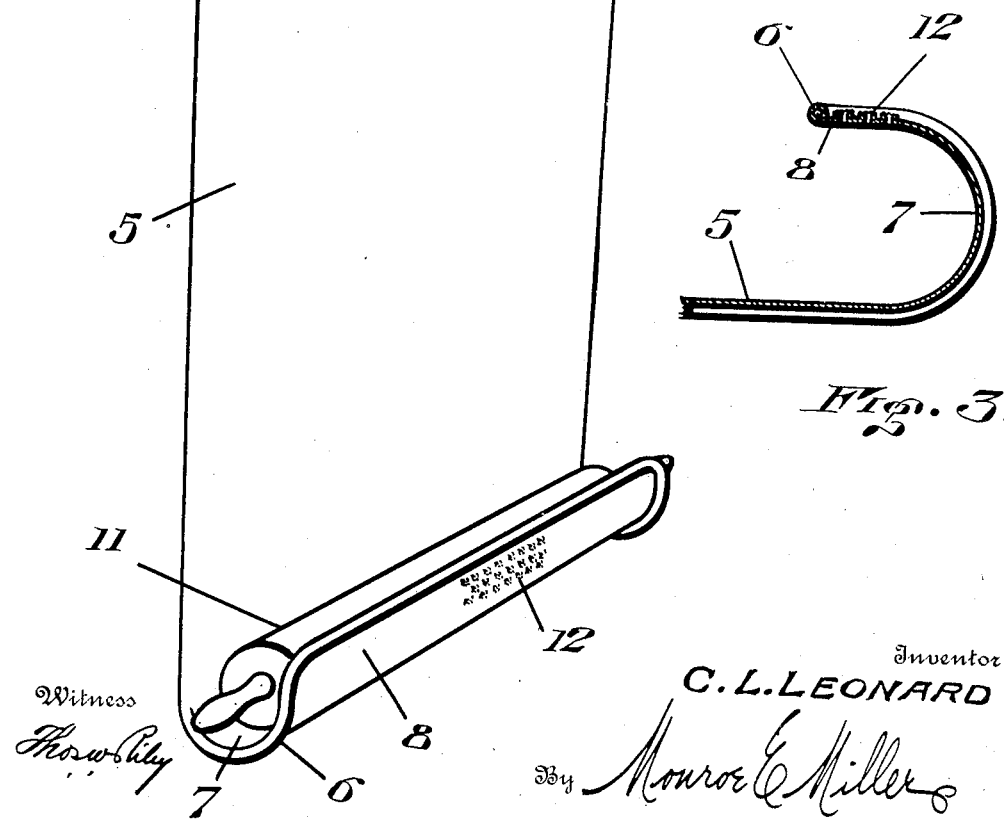
Inventor
C. L. LEONARD

UNITED STATES PATENT OFFICE.

CASWELL LEE LEONARD, OF CORINTH, MISSISSIPPI.

PASTRY-BOARD.

1,375,399.　　　　　Specification of Letters Patent.　　Patented Apr. 19, 1921.

Application filed April 27, 1920. Serial No. 377,106.

*To all whom it may concern:*

Be it known that I, CASWELL L. LEONARD, citizen of the United States, residing at Corinth, in the county of Alcorn and State of Mississippi, have invented certain new and useful Improvements in Pastry-Boards, of which the following is a specification, reference being had therein to the accompanying drawing.

The present invention relates to pastry boards, such as are used for kneading dough, and the like, and one of the objects of the invention is the provision of such a board composed of a sheet metal plate, which will be thoroughly sanitary and easy to clean, and which is provided at one end with a bent back portion forming a guard to prevent the flour or other material from falling from that end of the board nearest the person using the board, and to prevent the flour or other material soiling the clothes, such bent back portion also forming a trough or receptacle for holding a rolling pin when the board is suspended in a vertical position by means at the other end of the board to engage a hook, nail or other supporting element.

A further object is the provision of such a board having combined therewith in a novel manner, means for grating nutmegs, chocolate and the like, such grating means being provided on the bent back portion whereby the grated material can be caught in the trough and readily dumped into a receptacle from the trough.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein:—

Figure 1 is a perspective view of the board in horizontal position.

Fig. 2 is a perspective view showing the board suspended in a vertical position and supporting a rolling pin.

Fig. 3 is a longitudinal section through one end portion of the board illustrating the bent back portion and grater.

The board 5 comprises a rectangular plate of suitable sheet metal, which can be enameled, galvanized or otherwise plated or finished, and the margin of the board or plate is formed with a continuous bead 6, to stiffen the board and also prevent the edges and ends of the board from doing injury or damage.

One end portion of the board is bent back to provide a trough 7 and overhanging portion 8, and forming a guard or shield which can be disposed toward the person using the board, to prevent flour and other material falling or being worked over the end of the board toward the person, so as to avoid waste of the material and soiling of the clothes.

The board 5 is provided with an aperture 9 near its other end for engaging a hook, nail or other supporting element 10 for suspending the board in a vertical position, and in this position of the board, the trough 7 provides a receptacle for holding the rolling pin 11 which is used on the board. In this manner, the bent back portion not only provides an efficient shield at the end of the board, but also forms a receptacle or pocket for holding the rolling pin when not in use.

The bent back portion is also of utility, by the provision of a grater 12 in the overhanging portion 8 formed by perforating and punching the material outwardly. Thus, nutmegs, chocolate and other articles can be grated by rubbing them over the grater with the board in a horizontal position on the table or other support, and the grated material will fall on the board underneath the overhanging portion 8. Then, by raising the board to a vertical position, as seen in Fig. 2, the grated material will fall into the trough 7 and can be dumped from either end of the trough by tilting the board accordingly.

The present board thus has three-fold advantages as over its ordinary use as a pastry board, and can be readily cleaned as well as being inexpensively manufactured.

Having thus described the invention, what is claimed as new is:—

1. A device of the character described comprising a plate to lie on a support having one end bent back upwardly in overhanging position and forming a trough at said end of the plate, said bent back portion having a grater, whereby the grated material will fall on the plate and into the trough.

2. A device of the character described comprising a plate to lie on a support having one end bent back upwardly in overhanging position, and forming a trough at said end of the plate, said bent back portion being perforated and outstruck to provide a grater, in order that the grated material will drop onto the plate and into the trough.

In testimony whereof I hereunto affix my signature.

CASWELL LEE LEONARD.